Patented May 17, 1927.

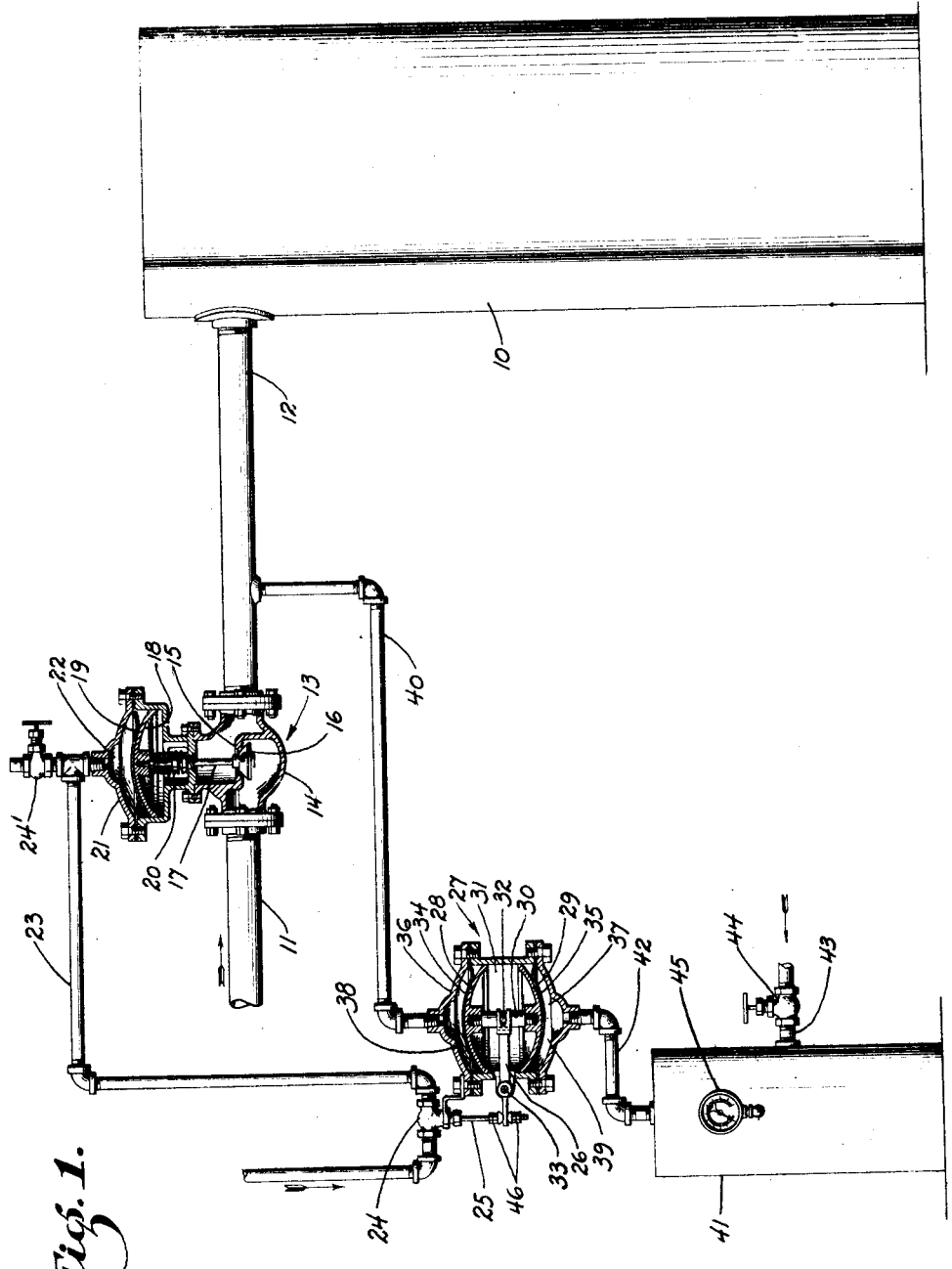

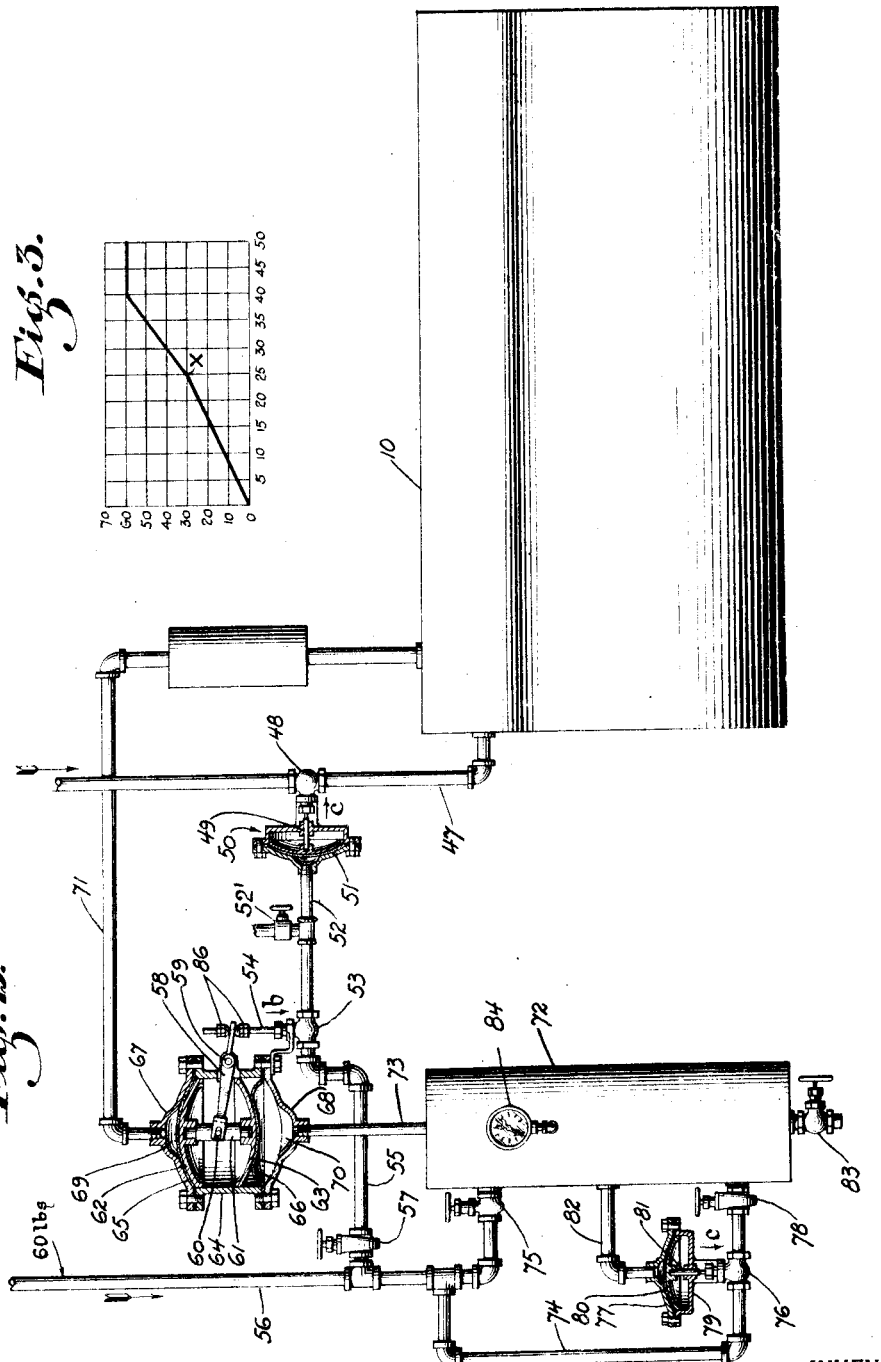

1,628,859

UNITED STATES PATENT OFFICE.

WILLIAM C. SHIELD, OF CROCKETT, CALIFORNIA.

PRESSURE-REGULATING APPARATUS.

Application filed January 26, 1926. Serial No. 83,941.

This invention relates to fluid control apparatus and particularly pertains to means whereby the pressure of fluids may be controlled or varied.

In the operation of various pieces of apparatus through which fluid passes, as for example, in a filter press or the like, it is desirable to maintain the fluid in various conditions of pressure, either at a reduced pressure from the line, a constant pressure or a variable pressure, which last condition may be recurrently brought about in a predetermined cycle of time.

It is the principal object of the present invention, therefore, to provide means operating in connection with a supply line within which fluid under pressure is flowing, and a suitable apparatus to which it is delivered, whereby the fluid pressure conditions may be accurately and automatically controlled and regulated.

The present invention contemplates the use of an auxiliary pressure tank which acts as a control medium in conjunction with valved diaphragms to regulate and control the pressure of fluid flowing through a feed line to a piece of apparatus within which it is employed.

The invention is illustrated by way of example in the accompanying drawings in which:

Fig. 1 is a view in diagram showing an embodiment of the present invention designed for maintaining a constant reduced pressure in a piece of apparatus.

Fig. 2 is a view in diagram showing an embodiment of the invention used for maintaining a sustained constant pressure, and gradually increasing variable pressure, and cycles of sustained and increasing pressures.

Fig. 3 is a graph showing the manner in which the apparatus of Fig. 2 may operate.

Referring more particularly to Fig. 1 of the drawing, 10 indicates a tank or piece of apparatus to which fluid under pressure is delivered through a high pressure pipe 11 and a continuing reduced pressure pipe 12. Interposed between contiguous ends of the pipes 11 and 12 is a reducing valve 13 which is formed with an outer valve housing 14 providing connections for the pipes 11 and 12 and being fitted with an intermediate valve seat 15. A valve member 16 is provided to operate in conjunction with the seat to control the volume of fluid passing from the high pressure pipe 11 to the reduced pressure pipe 12. A valve stem 17 is connected with the valve and is secured to a diaphragm shoe 18. This shoe is held against a flexible diaphragm 19 by means of a suitable spring 20, so that application of pressure on the diaphragm upon the opposite side from the shoe will cause the valve 16 to leave its seat 15 and permit high pressure fluid to flow from the high pressure pipe 11 into the reduced pressure pipe 12.

The diaphragm 19 is contained within a housing 21 which forms a pressure chamber 22 on the back of the diaphragm, this chamber receiving a fluid under pressure from any suitable source of supply through a pipe 23. A leak valve 24' is secured adjacent the diaphragm to permit the fluid within the chamber to gradually leak therefrom after an impulse of the valve 12 and when valve 24 is closed under certain conditions which will be hereinafter explained. The fluid supply pipe 23 is fitted with a control valve 24 at a point along its length, this valve being operated by a valve stem 25. The valve stem 25 is secured to lever 26 of a balanced diaphragm control mechanism 27. This mechanism comprises two shoes 28 and 29 secured at opposite ends of a spindle 30, and reciprocable in unison within a housing 31. The spindle 30 is provided with a yoke pin 32 which seats within the fork of a yoke on the end of the operating lever 26, and which lever is pivoted intermediate its ends upon a pivot pin 33.

It will thus be evident that as the diaphragm shoes 28 and 29 and the interposed spindle 30 move in unison, they will swing the valve control lever 26 to reciprocate the valve stem 25 of the valve 24. The assembled diaphragm shoes 28 and 29 are interposed between diaphragms 34 and 35. These diaphragms are enclosed within the housing 31 and their outer faces are enclosed by end plates 36 and 37 respectively. These plates combine with the diaphragms to form pressure compartments 38 and 39 within which fluid under pressure is delivered and by which the diaphragms are flexed.

The compartment 38 between diaphragm 34 and the cover 36 is supplied with fluid from the reduced pressure pipe 12 by a pipe 40, while the compartment 39 formed between the diaphragm 35 and the cover plate 37 is in communication with a fluid tank 41 by means of a pipe 42. The tank 41 is fitted with a supply pipe 43 connected with a suitable source of supply and controlled by a valve 44, while a pressure gage 45 is mounted on the tank to permit the pressure within the tank 41 to be constantly ascertained.

In operation of the device as shown in Fig. 1 and as described in the foregoing part of specification, it is understood that a constant reduced fluid pressure is desired within the tank or other apparatus 10. This fluid is obtained from a high pressure pipe 11 which is delivered as needed through the reduced pressure pipe 12.

In setting the apparatus a fluid is delivered to the tank 41 through supply pipe 43 until the gage 45 registers a pressure of fluid which is desired in the device 10. The valve 24 is then adjusted with relation to the valve lever 26 by adjusting screws 46, so that with the tank 41 at a desired pressure the valve 24 will be closed. The regulating valve 13 with its diaphragm mechanism is also adjusted so that when the valve 24 is closed the valve 16 will be seated.

It will be evident therefore, that when the pressure in the device 10 and the pipe 12 diminishes below the amount at which the gage 45 was initially set, the pressure in pipe 40 will be likewise diminished, thus relieving the fluid pressure in the chamber 38 of the diaphragm valve 27. This will cause the pressure of the fluid in the tank 41 and chamber 39 of the diaphragm valve 27 to move the diaphragm shoes 28 and 29 and their intermediate spindle 30 upwardly or toward the compartment 38 to flex the diaphragm 34, with the result that the outer end of the valve operating lever 26 will swing to move the valve stem 25 to open the valve 24. This action will allow fluid under pressure to pass along the supply pipe 23 to the chamber 22 of the regulating valve diaphragm mechanism. The pressure will then flex the diaphragm 19 to move the valve 16 from its seat, thus allowing fluid under high pressure to pass from the high pressure pipe 11 to the reduced pressure pipe 12 and in an amount which will bring the fluid pressure within the apparatus 10 up to the pressure initially indicated by the gage 45. When this pressure has been reached the pressure in compartments 38 and 39 of the diaphragm valve mechanism 27 will be equalized and the valve 24 will be again closed. The fluid within the pipe 23 and the diaphragm 22 of the reducing valve mechanism may then leak out through the leak valve 24' until the valve 16 has been again restored to its seat 15.

Referring particularly to Figs. 2 and 3 of the drawing, 10 indicates the apparatus to which fluid under pressure is to be delivered, as for example, a filter, and within which, in the present instance, the fluid pressure is to be gradually increased during different stages of the operation. Connecting with the device 10 is a main fluid supply pipe 47 from any suitable source of supply. Interposed at a point in the length of the pipe 47 is a regulating valve 48, which is indirectly operated under variation in the internal fluid pressure of device 10. The valve 48 is provided with a valve stem 49 reciprocably mounted within the housing of a regulating diaphragm structure 50. The valve opens when the stem moves in the direction of arrow "a" and is resisted by a suitable spring in the mechanism which would act to restore the valve to its normal position after the pressure upon the diaphragm is relieved. This structure carries a diaphragm 51 which is acted upon by fluid delivered under pressure through a pipe 52. The fluid flowing along pipe 52 is controlled or interrupted by a valve 53 having a reciprocating stem 54. The valve 53 connects with a pipe 55 and this in turn connects with an auxiliary fluid supply pipe 56. A primary control valve 57 is interposed between the pipe 55 and the pipe 56 and may be set as desired. The valve stem 54 is operably connected with an oscillating valve lever 58 mounted intermediate its ends on a pivot 59. The end of this valve lever opposite from its point of engagement with the stem 54 is bifurcated and engages a pin 60 carried on a spindle 61. A leak valve 52' similar to the valve 24' is mounted in the line 52 so that the fluid will have an opportunity to leak out of the pipe after the valve 53 has closed.

Mounted on the opposite ends of this spindle are diaphragm shoes 62 and 63. These shoes with the interposed spindle move in unison within a diaphragm housing 64. Secured at opposite ends of the housing are diaphragms 65 and 66 which will when flexed move the structure comprising the shoes 62 and 63 and will thus cause the pivoted valve lever 58 to swing. The opposite ends of the housing 64 are fitted with heads 67 and 68 which cooperate with the adjacent diaphragm 62 and 63 respectively to form fluid compartments 69 and 70 within which fluid will accumulate and by the pressure of which the diaphragms may be flexed and the structure thus operated.

The compartment 69 is in communication with the fluid receiving apparatus 10 by means of a pipe 71. The compartment 70 is connected with a control fluid tank 72 by a pipe 73. The control tank 72 is supplied with fluid under pressure through pipe 56 and through a branch pipe 74. The pipe 56 communicates with the upper end of the tank 72, the fluid passing therethrough being controlled by a needle valve 75. The fluid through pipe 74 is controlled by a valve 76 actuated by a diaphragm structure 77, while a valve 78 is interposed in the line between the needle valve 76 and the tank. The diaphragm structure 77 comprises a housing 79 within which is positioned a diaphragm 80. This diaphragm acts upon a valve stem 81 of the valve 76 to reciprocate the valve to open the valve 76 when the stem moves in the direction of the arrow "c." This movement is resisted by a suitable spring which would act to restore the valve to its normal position when the pressure is relieved from the diaphragm. Fluid from within the control tank 72 actuates the diaphragm 80 through a pipe 82, and an escape valve 83 is fitted in the tank at an end opposite from the end to which pipe 73 is attached. A suitable pressure gage 84 is mounted on the tank so that the pressure of the fluid within the tank and the pressure of the fluid within the complete circulating system may be constantly ascertained.

In operation of the form of the invention shown in Figs. 2 and 3, it will be assumed that the pressure of fluid within the apparatus 10 is to be gradually raised from zero to thirty pounds in twenty-five minutes, then gradually increased to sixty pounds over a period of fifteen minutes and sustained at this pressure for ten minutes, after which the cycle is repeated. This is indicated in the graph shown in Fig. 3. The valve 83 is closed and pressure is permitted to be built up in the control tank 72 to a pressure of 30 pounds in a period of 25 minutes by manually regulating and setting the needle valve 75. The fluid under pressure passing through the valve 75 to the tank is delivered through the secondary fluid supply pipe 56. The balanced diaphragm mechanism actuating lever 58 and valve stem 54 is so adjusted by the adjusting nuts 86 that valve 53 will be normal when the control tank 72 is under a desired pressure and the diaphragm will be in a central floating position between substantially equal pressures in the tanks 10 and 72.

Diaphragm structure 50 for valve 48 is so adjusted as to insure that valve 48 will be closed at the same time valve 43 is closed, at which time leak valve 52' will act to relieve the entrapped air in the pipe 52. It is to be understood that a spring in valve 76 normally acts to hold this valve closed against the pressure on diaphragm 80, and that when the pressure on this diaphragm is lower than the tension of the spring the valve 76 controlling the flow of fluid to the bottom of the control tank 72 will be closed. In the event that the pressure in the apparatus 10 drops below the pressure in the air tank, pressure will be correspondingly decreased in chamber 69 of the dual diaphragm valve, so that spindle 61 will move upwardly, thereby actuating the pivoted valve lever 58 to open the valve 53. This action will permit fluid under pressure to flow from the secondary supply pipe 56 at a velocity determined by the adjustment of valve 57 to the valve diaphragm structure 50. The pressure of the fluid against the diaphragm 51 will act upon the valve stem 49 to open the valve 48 and to permit the flow of fluid under pressure into the apparatus 10.

When the predetermined initial pressure has been reached in tank 10 a counterflow of fluid through pipe 71 will act to counterbalance diaphragms 65 and 66, and this in turn will close the valve 53. If, however, it is desired to run part of the cycle of operation at a different fluid pressure and to increase this pressure in a relatively shorter period of time, valve 76 is set so that it will be opened by the diaphragm structure 79 at a point of time at which the rate of flow of fluid to the apparatus 10 is to be increased. Therefore, this valve will then open permitting fluid to flow to the tank 72 at a rate controlled by the set valve 78. This will gradually increase the pressure in the tank and also the diaphragm 66 will be flexed to progressively increase the pressure in the apparatus 10 by opening valve 53 and 48, this point in the operation is indicated on Figure 3 at "x." This acceleration in pressure may continue until it reaches the initial pressure in pipe 56 and may then be interrupted by opening the relief valve 83 to allow the fluid to pass from the control tank 72. When it is desired to begin another cycle of operation, the valve 83 is closed.

It will thus be seen that by the apparatus here disclosed a constant fluid supply may be variably regulated or constantly fed to a device at a desired reduced pressure or at a gradually increasing pressure.

Having thus described my invention, what I claim and desire to secure by Letters Patent is:

1. A fluid regulating device, comprising in combination an apparatus for receiving said fluid at a fixed or gradually progressing pressure, a fluid supply line adapted to deliver fluid at a constant pressure to the apparatus, a valve interposed in the path of said fluid and between the source of supply and the apparatus, a control tank adapted to receive fluid from said source of supply, means for regulating the inflow of said fluid from the source of supply to the control tank whereby a desired pressure may be gradually established within the tank, a diaphragm valve controlling the main valve between the source of fluid supply and apparatus, means connecting said diaphragm valve with the source of supply whereby pressure on said diaphragm will act to open the valve and permit fluid to flow into the apparatus; a valve interposed between said diaphragm valve and the source of supply, and means controlled by the pressure of the fluid within the control tank for opening said valve and thereby permitting actuation of the diaphragm valve to admit fluid to the apparatus.

2. A fluid regulating device, comprising in combination an apparatus for receiving said fluid at a fixed or gradually progressing pressure, a fluid supply line adapted to deliver fluid at a constant pressure to the apparatus, a valve interposed in the path of said fluid and between the source of supply and the apparatus, a control tank adapted to receive fluid from said source of supply, means for regulating the inflow of said fluid from the source of supply to the control tank whereby a desired pressure may be gradually established within the tank, a diaphragm valve controlling the main valve between the source of fluid supply and apparatus, means connecting said diaphragm valve with the source of supply, whereby pressure on said diaphragm will act to open the valve and permit fluid to flow into the apparatus, a valve interposed between said diaphragm valve and the source of supply, and means controlled by the pressure of the fluid within the control tank for opening said valve and thereby permitting actuation of the diaphragm valve to admit fluid to the apparatus, and means whereby the increase of fluid pressure within the apparatus will be accelerated for a period of time when the pressure within the control tank reaches a predetermined point.

3. A fluid regulating and control device in combination, an apparatus for receiving said fluid, a main supply pipe delivering fluid to said apparatus, a regulating valve interposed in said pipe for controlling the rate of flow of fluid from the source of fluid supply to the apparatus, a diaphragm mechanism operating under pressure to open said regulating valve, a controlling tank, a balanced diaphragm mechanism one side of which is connected with the control tank and the other side of which is connected with the reciving apparatus, and a valve operated by said balanced diaphragm to permit fluid under pressure to flow against one side of the diaphragm of the regulating valve whereby an excess in pressure in the control tank over the pressure in the receiving apparatus will cause said regulating valve to be opened until the pressure in the apparatus reaches the pressure in the control tank, a source of fluid supply delivering fluid to the control tank and regulating means for controlling the inflow of fluid from said source of supply to the tank whereby the pressure within the tank will be gradually increased to a predetermined pressure in a predetermined period of time.

4. A fluid regulating and control device in combination, an apparatus for receiving said fluid, a main supply pipe delivering fluid to said apparatus, a regulating valve interposed in said pipe for controlling the rate of flow of fluid from the source of fluid supply to the apparatus, a diaphragm mechanism operating under pressure to open said regulating valve, a controlling tank, a balanced diaphragm mechanism one side of which is connected with the control tank and the other side of which is connected with the receiving apparatus, and a valve operated by said balanced diaphragm to permit fluid under pressure to flow against one side of the diaphragm of the regulating valve whereby an excess in pressure in the control tank over the pressure in the receiving apparatus will cause said regulating valve to be opened until the pressure in the apparatus reaches the pressure in the control tank, a source of fluid supply delivering fluid to the control tank, and regulating means for controlling the inflow of fluid from said source of supply to the tank whereby the pressure within the tank will be gradually increased to a predetermined pressure in a predetermined period of time, and secondary means for connecting said control tank with said source of supply, and valve means interposed therein whereby said secondary means will be placed in communication with the control tank when the predetermined pressure has been built up within the tank and will thereafter progressively build up the pressure to the pressure of the source of supply with a corresponding action within the apparatus.

WILLIAM C. SHIELD.